United States Patent [19]

Wiezer

[11] 4,451,400
[45] May 29, 1984

[54] PHOSPHAZENES USEFUL AS STABILIZERS IN POLYMERS

[75] Inventor: Hartmut Wiezer, Gersthofen, Fed. Rep. of Germany

[73] Assignee: Hoechst Aktiengesellschaft, Fed. Rep. of Germany

[21] Appl. No.: 375,889

[22] Filed: May 7, 1982

[30] Foreign Application Priority Data

May 13, 1981 [DE] Fed. Rep. of Germany ....... 3118962

[51] Int. Cl.³ .................. C07D 251/70; C07D 401/12
[52] U.S. Cl. .................................. 260/244.4; 544/195;
544/113; 544/129; 546/21
[58] Field of Search ....................... 544/195, 113, 129;
260/244.4; 546/21

[56] References Cited

U.S. PATENT DOCUMENTS 3,844,983 10/1974 Reynard et al. ..................... 260/2 P
4,086,204 4/1978 Cassandrini et al. ............... 544/207
4,232,131 11/1980 Rody et al. ......................... 525/184

FOREIGN PATENT DOCUMENTS 2636144 6/1977 Fed. Rep. of Germany.
2719131 12/1977 Fed. Rep. of Germany.

Primary Examiner—John M. Ford
Attorney, Agent, or Firm—Connolly and Hutz

[57] ABSTRACT

Halogenophosphazenes of the formula

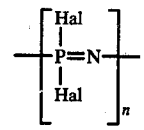

in which n denotes 3 to 100, are reacted with alcohols or amines having polyalkylpiperidyl groups to give compounds which are suitable for stabilizing synthetic polymers and are distinguished by a very high migration resistance.

1 Claim, No Drawings

PHOSPHAZENES USEFUL AS STABILIZERS IN POLYMERS

The literature describes numerous compounds which contain polyalkylpiperidine groups and which have been proposed as light stabilizers for organic polymers. Thus, for example, German Offenlegungsschrift No. 2,719,131 describes polymeric polyalkylpiperidine compounds which, however, are completely inadequate above all in their stabilizing action. German Patent No. 2,636,144 relates to polymeric light stabilizers which are based on triazines and which although they are among the best of the present state of the art are not satisfactory, particularly in respect of migration into fats as evidenced by the fact that they are very readily soluble in heptane.

Stabilizers having a defined high molecular weight are known, for example from German Patent No. 2,636,130. However, these products also have deficiencies in that they are also too readily soluble in heptane, from which fact a high migration into fats can be inferred.

The object of the present invention was therefore to find compounds which have a defined, high molecular weight and which are better than known stabilizers, in particular in respect of the migration into fats and volatility.

It has been found that these requirements are very substantially satisfied by new polymeric phosphazenes which carry piperidine groups.

The new compounds correspond to the general formula (I)

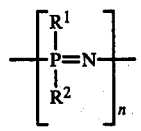

(I)

in which n is an integer from 3 to 100, preferably from 3 to 25, and in particular from 3 to 10, and when n represents an integer from 3 to 6, the structural units of the formula (I) are preferably cyclically arranged and in that case rings having 3 or 4, preferably 3, phosphazene units of the formula (I) are preferable.

$R^1$ and $R^2$ are identical or different and are intended to symbolize that the phosphazenes are substituted by identical radicals or by different substituents which are randomly distributed in the molecule. The radicals $R^1$ and $R^2$ represent groups of the formulae (II), (III) or (IV), preferably (II) or (IV), and in particular (IV), or in addition to these groups they represent halogen, preferably chlorine.

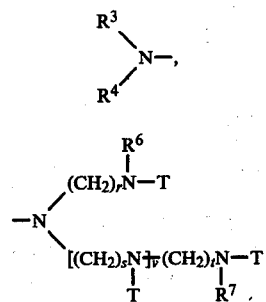

In the formula (II), $R^3$ and $R^4$ are identical or different and denote hydrogen, $C_1$- to $C_{18}$-, preferably $C_1$- to $C_{12}$- and in particular $C_1$- to $C_6$-alkyl, $C_5$- to $C_{12}$-cycloalkyl, phenyl, which can be substituted by Cl, $CH_3O$- or $C_1$- to $C_4$-alkyl, or $C_7$- to $C_9$-phenylalkyl, or they represent a group of the formula (V)

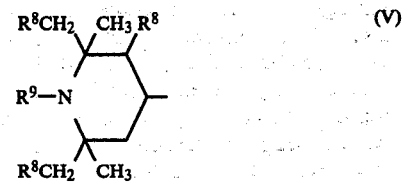

in which $R^8$ denotes hydrogen or methyl, preferably hydrogen, and $R^9$ denotes hydrogen, $C_1$- to $C_4$-alkyl which can be substituted by up to 2 OH groups, 2,3-epoxypropyl, allyl or benzyl, but preferably hydrogen.

$R^3$ additionally denotes $C_3$- to $C_{21}$-alkoxyalkyl, preferably $C_1$- to $C_{18}$-alkoxypropyl, and in particular $C_1$- or $C_2$-alkoxypropyl, and $R^3$ and $R^4$ together with the N atom linking them can also represent a pyrrolidine ring or a piperidine, morpholine or hexamethyleneimine ring which is unsubstituted or substituted by up to 4 $C_1$- to $C_4$-alkyl groups, preferably methyl groups.

In the formula (III), r, s and t have the meaning of identical or different integers from 2 to 6, preferably 2 or 3, v represents an integer from 0 to 3, preferably 0 or 1, and in particular 0 and $R^6$ and $R^7$ represent identical or different radicals $R^5$, preferably hydrogen or a group of the formula (V) and in particular hydrogen and T has the meaning of a group of the formula (VI)

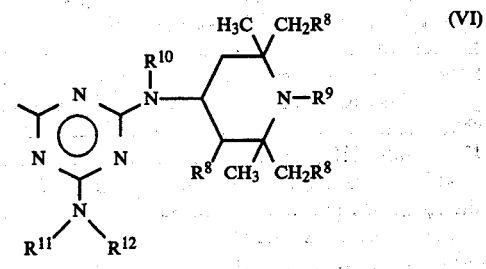

in which $R^8$ and $R^9$ have the meanings indicated above, $R^{10}$ and $R^{11}$ are identical or different radicals having the meaning of $R^3$ and $R^{12}$ is a radical having the meaning of $R^4$.

In the formula (IV), $R^5$ represents a radical $R^4$ or a group of the formula (VII) or (VIII)

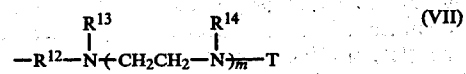

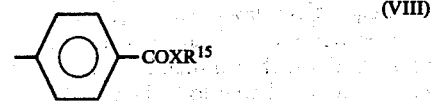

in which X denotes 0 or $NR^3$, with $R^3$ as indicated above, and $R^{15}$ denotes $CH_3$, $C_2H_5$ or a group of the formula (V), m denotes 0 or 1, preferably 0, T denotes a radical of the formula (VI), $R^{12}$ denotes $C_2$- to $C_6$-alkylene, in the case where m denotes 1, preferably ethylene, $R^{13}$ denotes a radical $R^4$, preferably hydrogen, and when m denotes 1, hydrogen or T, and $R^{14}$ denotes a radical $R^4$, preferably hydrogen.

In the formula (I), the group of the formula (V) must be contained at least once, but preferably several times, and in particular at least once per P=N unit.

The new phosphazene-based light stabilizers containing piperidyl groups do not have the disadvantages indicated above. While they are sparingly volatile and sparingly soluble in heptane, they are highly active, have a high migration resistance to washing out with water and because of the fact that they are sparingly soluble in heptane allow the inference of a low migration into fats and they are also extraordinarily heat-stable. Although a certain susceptibility to hydrolysis would have to be suspected, this is not the case. Another advantage when using the particularly preferable cyclic phosphazenes is that the compounds tend to form high molecular weight products at high temperatures of about 300° C., which occur in the production of fibers and films from polyolefins. This effect is particularly favorable as regards the volatility.

The products according to the invention are obtained by reacting oligomeric or polymeric halogenophosphazenes of the formula (I a)

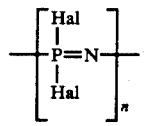

(I a)

in which Hal denotes fluorine, chlorine, bromine or iodine, but in particular chlorine, and n has the meaning indicated above, with compounds of the formulae (II) to (IV) which are saturated by hydrogen. If the products used are those of the formulae H-(II) or H-(III), ie. amines, the latter can be added in excess as hydrogen halide acceptors, but it is more favorable for this purpose to use additional bases such as triethylamine, pyridine, alkali metal hydroxides or alkali metal carbonates. If alcohols $HOR^5$ derived from the formula (IV) are used as a starting material, they are preferably used in the form of their alkali metal salts.

The reaction is carried out in inert organic solvents such as dioxane, tetrahydrofuran, acetone, ether, benzene, toluene, xylene, mesitylene or mixtures thereof and at a reaction temperature of between 20° and 200° C. The reaction is preferably carried out at 80 to 200 and in particular at 110° to 200° C.

If equivalent amounts of compound (I a) and of products of the formulae H-(II), H-(III) or H-(IV) are used, all halogen atoms of the halogenophosphazenes are substituted in a single process step. The use of mixtures, of course, allows the introduction of different radicals (II), (III) or (IV), but not in a pinpointed manner. If an amount of H-(II), H-(III) or H-(IV) is used which is less than equivalent, but at least equimolar, partial substitution products are obtained which still carry halogen atoms and which can then be reacted with the equivalent amount, relative to residual halogen, of a further, preferably sterically non-labile compound of the formula H-(II), H-(III) or H-(IV). This process variant also makes possible the pinpointed introduction of more than two different radicals.

The halogenophosphazenes which serve as a starting material and which are also known by the name halogenoazaphosphorines are obtained by known processes from phosphorus halides and ammonium halides (cf. Ullmann, 4th edition, volume 18, page 373). Products which have a cyclic structure [$(PNCl_2)_3$ and $(PNCl_2)_4$] are formed, for example from $PCl_5$ and $NH_4Cl$ by polymerization of the phosphorus dichloride nitride formed as an intermediate product. Short-chain linear halogenophosphazenes are obtained from $PCl_3+NH_4Cl+Cl_2$ at 140° C., and by heating cyclic halogenophosphazenes at 250° to 300° C. long-chain linear polymers are produced. According to the invention, not only linear but also cyclic halogenophosphazenes formed from 3 to 100 phosphorus dihalide nitride structural units are suitable for use, preferably those which are cyclic and comprise 3 or 4, in particular 3, monomer units. The chlorides are generally used.

Examples of starting compounds of the formula (II) fully saturated by H are
1. 2,2,6,6-Tetramethyl-4-aminopiperidine
2. 2,2,6,6-Tetramethyl-4-butylaminopiperidine
3. 2,2,6,6-Tetramethyl-4-octadecylaminopiperidine
4. 2,2,6,6-Tetramethyl-4-(3-methoxy)-propylaminopiperidine
5. 2,2,6,6-Tetramethyl-4-(3-dimethylamino)-propylaminopiperidine
6. Ammonia
7. Methylamine
8. Butylamine
9. Hexylamine
10. Dodecylamine
11. 2-Ethylhexylamine
12. Octadecylamine
13. Cyclohexylamine
14. Benzylamine
15. 3-Methoxypropylamine
16. 3-Octadecyloxypropylamine
17. 3-Dimethylaminopropylamine
18. Diethylamine
19. Dibutylamine
20. Dicyclohexylamine
21. Dioctadecylamine Examples of starting compounds of the formula (III) fully saturated by H are:
22. 1,9-Bis-[2,4-bis-<N-(2,2,6,6-tetramethyl-4-piperidyl)-3-methoxypropylamino>-1,3,5-triazin-6-yl]-1,5,9-triazanonane
23. 1,7-Bis-[2,4-bis-<N-(2,2,6,6-tetramethyl-4-piperidyl)-3-methoxypropylamino>-1,3,5-triazin-6-yl]-1,4,7-triazaheptane
24. 1,5,12-Tris-[2,4-bis-<N-(2,2,6,6-tetramethyl-4-piperidyl)-3-methoxypropylamino>-1,3,5-triazin-6-yl]-1,5,8,12-tetraazadodecane Examples of starting compounds of the formula (IV) fully saturated by H are:
25. 2,2,6,6-Tetramethylpiperidin-4-ol
26. Methanol
27. Butanol
28. Octadecyl alcohol
29. 2-(3-Hydroxypropylamino)-4,6-bis-[N-(2,2,6,6-tetramethyl-4-piperidyl)-amino]-1,3,5-triazine
30. 2-(3-Hydroxypropylamino)-4,6-bis-[N-(2,2,6,6-tetramethyl-4-piperidyl)-butylamino]-1,3,5-triazine
31. 2-(3-Hydroxypropylamino)-4,6-bis-[N-(2,2,6,6-tetramethyl-4-piperidyl)-3-methoxypropylamino]-1,3,5-triazine 32. 2-(6-Hydroxyhexylamino)-4,6-bis-[N-(2,2,6,6-tetramethyl-4-piperidyl)-3-methoxypropylamino]-1,3,5-triazine
33. 2-(3-Hydroxypropylamino)-4-octadecylamino-6-[N-(2,2,6,6-tetramethyl-4-piperidyl)-3-methoxypropylamino]-1,3,5-triazine
34. 2-(2-Hydroxyethylamino)-4,6-bis-[N-(2,2,6,6-tetramethyl-4-piperidyl)-3-methoxypropylamino]-1,3,5-triazine
35. 2-(6-Hydroxyhexylamino)-4-[N-(2,2,6,6-tetramethyl-4-piperidyl)-3-dimethylaminopropylamino]-6-[N-(2,2,6,6-tetramethyl-4-piperidyl)-3-methoxypropylamino]-1,3,5-triazine
36. 2-(3-Hydroxypropylamino)-4-butylamino-6-[N-(2,2,6,6-tetramethyl-4-piperidyl)-3-methoxypropylamino]-1,3,5-triazine
37. 2-(2-Hydroxyethylamino)-4-(3-octadecyloxypropylamino)-6-[N-(2,2,6,6-tetramethyl-4-piperidyl)-3-methoxypropylamino]-1,3,5-triazine
38. 2-(3-Hydroxypropylamino)-4-(diethylamino)-6-[N-(2,2,6,6-tetramethyl-4-piperidyl)-butylamino]-1,3,5-triazine
39. 2-(6-Hydroxyhexylamino)-4-benzylamino-6-[N-(2,2,6,6-tetramethyl-4-piperidyl)-3-methoxypropylamino]-1,3,5-triazine
40. 2-(3-Hydroxypropylamino)-4,6-bis-[N-(2,2,6,6-tetramethyl-4-piperidyl)-octadecylamino]-1,3,5-triazine
41. 2-(3-Hydroxypropylamino-4,6-bis-{1,9-bis-[2,4-bis-<N-(2,2,6,6-tetramethyl-4-piperidyl)-3-methoxypropylamino>-1,3,5-triazin-6-yl]-1,5,9-triazanon-5-yl}-1,3,5-triazine The new compounds, as already stated, are highly suitable for stabilizing plastics against their photooxidative degradation, ie. damage through the action of oxygen, heat and light.

Examples of such plastics are:

Polymers which are derived from singly or doubly unsaturated hydrocarbons, for example polyolefins such as polyethylene, which may be crosslinked, polypropylene, polybut-1-ene, polyisobutene, polymethylbut-1-ene, polymethylpent-1-ene, polyisoprene, polybutadiene, polystyrene, copolymers of the parent monomers of the homopolymers mentioned, such as ethylene-propylene copolymers, propylene-but-1-ene copolymers, propylene-isobutene copolymers, styrene-butadiene copolymers and terpolymers of ethylene and propylene with a diene, such as, for example, hexadiene, dicyclopentadiene or ethylidenenorbornene; mixtures of the abovementioned homopolymers, such as, for example, mixtures of polypropylene and polyisobutylene or of a butadiene-acrylonitrile copolymer and a styrene-butadiene copolymer.

Halogen-containing vinyl polymers, such as polyvinyl chloride, polyvinylidene chloride, polyvinyl fluoride, polychloroprene and chlorinated rubbers, and copolymers of vinyl chloride and vinylidene chloride amongst one another and with other olefinically unsaturated monomers.

Polymers which are derived from $\alpha,\beta$-unsaturated acids and their derivatives, such as polyacrylates and polymethacrylates, polyacrylamides and polyacrylonitrile and their copolymers amongst one another and with other vinyl compounds, such as acrylonitrile-butadiene-styrene, acrylonitrile-styrene and acrylonitrile-styrene-acrylate copolymers.

Polymers which are derived from unsaturated alcohols and amines or their acyl derivatives or acetals, such as polyvinyl alcohol, polyvinyl acetate, stearate, benzoate and maleate, polyvinylbutyral, polyallyl phthalate, polyallylmelamine and their copolymers with other vinyl compounds, such as ethylene/vinyl acetate copolymers.

Homo- and copolymers which are derived from epoxides, such as polyethylene oxide or the polymers which are derived from bis-glycidyl ethers.

Polyacetals, such as polyoxymethylene and polyoxyethylene and those polyoxymethylenes which contain ethylene oxide as a conomoner.

Polyurethanes and polyureas.

Polycarbonates.

Polyamides and copolyamides which are derived from diamines and dicarboxylic acids and/or amino acids or the corresponding lactams, such as polyamide 6, polyamide 6/6, polyamide 6/10, polyamide 11 and polyamide 12.

Polyesters which are derived from dicarboxylic acids and dialcohols and/or from hydroxycarboxylic acids or the corresponding lactones, such as polyethylene terephthalate, polybutylene terephthalate and poly-1,4-dimethylolcyclohexane terephthalate.

Crosslinked polymers which are derived from aldehydes on the one hand and from phenols, ureas and melamines on the other hand, such as phenol-formaldehyde, urea-formaldehyde and melamine-formaldehyde resins.

The new compounds can finally also be used as stabilizers in the resin and paint field. Examples are thermosetting and thermoplastic acrylic resins, which are used for automotive finishes, acrylic resin paints, these are the customary baking enamels and very particularly mixtures based on hot-crosslinkable acrylic resin and styrene, and paints and coatings based on acrylic/melamine resin and alkyd/acrylic/melamine resin. Such paints can also contain as further additives other customary light stabilizers, phenolic antioxidants, pigments, dye-stuffs, metal deactivators and the like.

Of particular importance is the stabilization of polyolefins, styrene polymers, polyamides, poly(meth)acrylates and of polyurethanes for which the compounds are particularly suitable. Examples of this are high and low density polyethylene, polypropylene, ethylene-propylene copolymers, polystyrene, styrene-butadiene-acrylonitrile terpolymers, mixtures of polyolefins or of styrene polymers and polyether- or polyester-based polyurethanes.

The new stabilizers are incorporated by generally customary methods into the polymer compositions. For example, the incorporation can be effected by mixing the compounds and, if appropriate, other additives into the melt by the methods customary in industry before or during the shaping, or also by applying the dissolved or dispersed compounds onto the polymer directly or by mixing the former into a solution, suspension or emulsion of the latter, if appropriate with allowing the solvent to evaporate subsequently. The amounts are 0.01 to 5, preferably 0.05 to 2.5, and in particular 0.1 to 1.0, % by weight, relative to the material to be stabilized. The new compounds can also be added to the plastics to be stabilized in the form of a master batch which contains these compounds, for example in a concentration of 1 to 50, preferably 2.5 to 20, % by weight.

The plastics stabilized by the addition of the substances according to the invention may also contain other known customary additives, such as, for example, antioxidants based on phenol and sulfide, metal deactivators and light stabilizers, phosphite stabilizers, metal compounds, epoxy stabilizers and polyhydric alcohols.

Examples of antioxidants are sterically hindered phenols, such as 2,6-di-tert.-butyl-4-methylphenol, 4,4'-butylidene-bis-(2,6-di-tert.-butylphenol), 4,4'-thio-bis-(2-tert.-butyl-5-methylphenol), 2,5-di-tert.-butyl-4-hydroxyanisole, dioctadecyl 2,2-bis-(3,5-di-tert.-butyl-2-hydroxybenzyl)-malonate, 1,3,5-tris-(3,5-di-tert.-butyl-4-hydroxybenzyl)-2,4,6-trimethylbenzene, 2,4,6-tri-(3,5-di-tert.-butyl-4-hydroxybenzyl)-phenol, phenolic triazine compounds, such as 1,3,5-tris-(3,5-di-tert.-butyl-4-hydroxybenzyl) isocyanurate, esters of $\beta$-(3,5-di-tert.-butyl-4-hydroxyphenyl)-propionic acid and, for example, octadecanol, pentaerythritol and tris-hydroxyethyl isocyanurate, esters of 3,3-bis-(3-tert.-butyl-4-hydroxyphenyl)-butanoic acid and, for example, ethylene glycol, esters of thiodipropionic acid and fatty alcohols, the Ca salt or Ni salt of 3,5-di-tert.-butyl-4-hydroxybenzylphosphoric acid ethyl ester, dioctadecyl sulfide and dioctadecyl disulfide.

UV absorbers and light stabilizers include 2-(2'-hydroxyphenyl)-benzotriazoles, such as, for example, the 5-chloro-3',5'-di-tert.-butyl and 5-chloro-3',5'-di-tert.-amyl derivatives, 2-hydroxybenzophenones, such as, for example, the 4-heptoxy or 4-octoxy derivatives, salicylates, such as octylphenyl salicylate, nickel complexes, such as, for example, those formed with 2,2'-thiobis-4-(1,1,3,3-tetramethylbutyl)-phenol and butylamine or with other amines, oxalic acid diamides and sterically hindered amines.

The phosphites which may be mentioned are aliphatic, aromatic or aliphatic-aromatic phosphites, such as, for example, trisnonylphenyl phosphite, tris-(2,4-di-tert.-butylphenyl) phosphite, tris-(2-tert.-butylphenyl) phosphite or esters of pentaerythritol phosphite.

Metal compounds which are known as stabilizers are understood as meaning the calcium, barium, strontium, zinc, cadmium, magnesium, aluminum and lead soaps of aliphatic carboxylic acids or hydroxycarboxylic acids having about 12 to 32 C atoms, salts of the metals mentioned with aromatic carboxylic acids, such as benzoates or salicylates, and (alkyl-) phenolates of these metals, and also organotin compounds, such as, for example, dialkyltin thioglycolates and dialkyltin carboxylates.

Examples of known epoxy stabilizers are epoxidized higher fatty acids, such as epoxidized soya bean oil, tall oil, linseed oil or epoxidized butyl oleate and epoxides of long-chain olefins.

Possible examples of polyhydric alcohols are pentaerythritol, trimethylolpropane, sorbitol and mannitol, ie. preferably alcohols having 5 or 6 C atoms and 2 to 6 OH groups.

An effective stabilizer combination for poly-$\alpha$-olefins, such as, for example, high, medium and low pressure polymers of $C_2$- to $C_4$-$\alpha$-olefins, in particular for polyethylene and polypropylene, or for copolymers of such $\alpha$-olefins, comprises, relative to 100 parts by weight of polymer, for example 0.01 to 5 parts by weight of one of the compounds to be used according to the invention, 0.05 to 5 parts by weight of a phenolic stabilizer, if appropriate 0.01 to 5 parts by weight of a sulfur-containing costabilizer and if appropriate 0.01 to 3 parts by weight of a basic or neutral metal soap, such as, for example, calcium stearate or zinc stearate or the corresponding oxides and, if appropriate, 0.01 to 5 parts by weight of a known UV stabilizer from the group comprising alkoxyhydroxybenzophenones, 4-hydroxyphenylbenzotriazoles, mononitrile benzylidenemalonates and quenchers, such as, for example, nickel chelates. Examples of other customary additives are plasticizers, lubricants, emulsifiers, fillers, such as, for example, chalk, talc, asbestos, pigments, optical brighteners, flameproofing agents and antistatic agents.

Plastics stabilized according to the invention can be used in a widely varying form, for example as sheeting, fibers, tapes, profiles or as binders for paints, adhesives or cements.

In the examples which follow and serve to illustrate the invention in more detail, the individual starting compounds used are identified by numerals which refer to the tabulation on pages above. The process products are all resins which by nature do not have sharp melting points, so that the data indicated for the latter are merely approximate values. The term "resin" denotes that it is a soft resin.

EXAMPLE 1

13.0 g (0.02 mole) of compound 32 together with 0.6 g (0.02 mole) of 80% strength NaH (in paraffin) were stirred in 100 ml of absolute mesitylene at 150° C. until the evolution of hydrogen was complete. 3.5 g (0.01 mole) of 2,2,4,4,6,6-hexachloro-2,2,4,4,6,6-hexahydro-1,3,5-triaza-2,4,6-triphosphorine (IUPAC nomenclature; referred to below as $(PNCl_2)_3$) were then added and the resulting mixture stirred for 15 hours at 110° C. It was filtered, and the filtrate was concentrated in vacuo. The remaining solid resin had a melting point of 108° to 117° C.

Analysis: found: P 6.0%; C 52.9%; H 8.7%; N 16.3%. calculated: P 5.92%; C 53.44%; H 8.53%; N 16.93%.

EXAMPLES 2 TO 11

The procedure of Example 1 was followed but with a reaction temperature of 160° C.

| Example No. | Starting material Compound No. (g = Mole) | $(PNCl_2)_3$ (g = Mole) | Reaction time (hours) | Melting point of process product (°C.) |
|---|---|---|---|---|
| 2 | 31 (18.2 = 0.45) | 5.2 (0.015) | 16 | ~92 |
| 3 | 31 (12.1 = 0.02) | 1.7 (0.005) | 16 | ~70 |
| 4 | 31 (12.1 = 0.02) | 1.17 (1/300) | 30 | ~90 |
| 5 | 32 (12.9 = 0.02) | " | 30 | ~80 |
| 6 | 29 (9.2 = 0.02) | " | 16 | ~100 |
| 7 | 30 (11.5 = 0.02) | " | 16 | ~150 |
| 8 | 38 (8.7 = 0.02) | " | 24 | ~95 |
| 9 | 37 (13.8 = 0.02) | " | 24 | resin |
| 10 | 36 (9.0 = 0.02) | " | 24 | ~120 |
| 11 | 42 (11.0 = 0.02) | " | 30 | resin |

EXAMPLE 12

A solution of 10 ml of absolute xylene and 6.9 g (0.03 mole) of compound 4 was added dropwise to 30 ml of absolute xylene and 3.5 g (0.01 mole) of $(PNCl_2)_3$. After 30 minutes, 1.2 g (0.03 mole) of NaOH powder were added, and the mixture was stirred for a further 5 hours. 6 g (~0.06 mole) of compound 15 were then added and the resulting mixture was boiled for 8 hours under a water separator. The mixture was filtered, and the filtrate concentrated in vacuo. Yield: 10 g of a viscous resin. Analysis: calculated: P 8.61% found: P 8.6%.

EXAMPLE 13

7.5 g (2/300 mole) of 2,2,4,4,6,6-hexakis-[4-carbethoxyphenoxy]-2,2,4,4,6,6-hexahydro-1,3,5-triaza-2,4,6-phosphorine, which had been obtained from $(PNCl_2)_3$ and the equivalent amount of ethyl 4-hydroxybenzoate, and 6.2 g (12/300 mole) of compound 1 were stirred for 8 hours at 250° C. while a slow stream of nitrogen was passed through the mixture. Volatile constituents were then removed in vacuo at 120° C. A solid resin remained. Melting point ∼220° C.

EXAMPLE 14

The procedure followed was as in Example 13 and 4.0 g (0.004 mole) of the phosphorine used there and 11.0 g (0.02 mole) of compound 4 were used and a resin of melting point ∼76° C. obtained.

EXAMPLE 15

This example demonstrates the volatility of the new phosphorus-containing stabilizers compared to a product of the most recent state of the art.

The volatilities were determined in an apparatus for thermogravimetric analysis. This involved heating equal amounts (500 mg) of compounds according to the invention and of the comparative substance in a nitrogen atmosphere with a heating-up rate of 2K/min up to 300° C. and measuring the loss of material in mg/cm² of sample surface area. The results are shown in the table below:

| Stabilizer according to Example | Weight loss in mg/cm² when reaching ...°C. | | | |
|---|---|---|---|---|
| | 220 | 260 | 300 | 10 minutes at 300° C. |
| Comparison+ | 0.32 | 1.11 | 9.48 | 58.46 |
| 6 | — | 1.26 | 3.79 | 6.95 |

+Compound in accordance with Example 1 of German Offenlegungsschrift 2,719,131

EXAMPLE 16

The recipe constituents indicated below were mixed, by means of a high speed laboratory mixer, into polypropylene (®Hostalen PPU VP 1770 F from Hoechst AG) of melt flow index 190/5=1.9 g/10 min, see DIN 53,535. The mixture was processed into granules and the material thus stabilized was melted under the customary processing conditions in a laboratory extruder and spun, via a spin pump having an eight-fold spinning head, into monofilaments which were then further stretched in a ratio of 1:3, texturized to give a 40 dtex yarn and the latter processed into test fabrics.

100 parts by weight of polypropylene,
0.2 part by weight of calcium stearate,
0.1 part by weight of ethylene glycol 3,3-bis-(3-tert.-butyl-4-hydroxyphenyl)-butanoate,
0.1 part by weight of dioctadecyl disulfide and
0.3 part by weight of the stabilizer, according to the invention, under test.

The fabric samples were stretched across a piece of cardboard with a hole in such a manner that a free opening having a diameter of about 15.5 mm remained. The test pieces were artificially weathered in this form in a Xenotest X 1200 instrument from Messrs. Original Hanau Quarzlampen GmbH by irradiation with alternating light. The radiation intensity was modulated by UV filters (special filter glass d=1.7 mm). The light resistance was tested according to DIN 53,387 (17 min dry period, 3 min rain, black panel temperature 45° C., relative humidity during the dry period 70 to 75%).

At certain time intervals, the fabrics were loaded in the middle with a weight of 6 mm diameter and under a pressure of 0.1 N/mm². Failure was indicated by the weight breaking through the fabric.

| Stabilizer according to Example | Light exposure time in hours |
|---|---|
| Polypropylene Comparison+ | <280 |
| | 1,400 |
| 6 | <3,000[1] |

+Compound in accordance with Example 1 of German Offenlegungsschrift 2,719,131
[1]Weight has still not broken through

EXAMPLE 17

The stabilized granules prepared as in the preceding example was processed on a laboratory film blowing installation (screw diameter 25 mm, length 20 D, temperature program 200°, 240°, 250°, 255° C.) into about 70 μm thick blown films. The films were artificially weathered in the Xenotest X 1200 apparatus as described in Example 16. The carbonyl number in line with DIN 63 383, part 2, was determined as an indicator of the amount of damage. (For PP this is defined as the ratio of the extinctions at 1715 cm⁻¹ and 1524 cm⁻¹).

| Stabilizer according to Example | C = O number after ... hours | | | |
|---|---|---|---|---|
| | 500 | 1,000 | 2,000 | 2,500 |
| Polypropylene Comparison+ | >2 | — | — | — |
| | | >2 | | |
| 6 | <0.1 | 0.1 | 0.3 | 0.5 |

+Compound in accordance with Example 1 of German Offenlegungsschrift 2,719,131

I claim:

1. A phosphazene, substituted by piperidyl groups, of the formula (I)

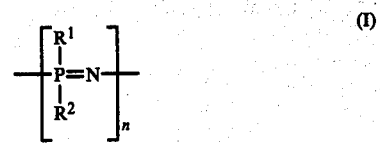

in which
n is an integer from 3 to 100,
$R^1$ and $R^2$ are identical or different and represent a group of the formulae (II), (III), or (IV)

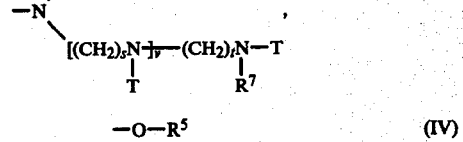

or represent, in addition to at least one of these groups, halogen, and in the formula (II)

$R^3$ and $R^4$ are identical or different and represent hydrogen, $C_1$- to $C_{18}$-alkyl, $C_5$- to $C_{12}$-cycloalkyl, phenyl, which can be substituted by Cl, $CH_3O$- or $C_1$- to $C_4$-alkyl, or $C_7$- to $C_9$-phenylalkyl or they denote a group of the formula (V)

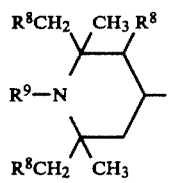

(V)

in which $R^8$ represents hydrogen or methyl and $R^9$ represents hydrogen, $C_1$- to $C_4$-alkyl which can be substituted by up to two OH groups, 2,3-epoxypropyl, allyl or benzyl, $R^3$ additionally represents $C_3$- to $C_{21}$-alkoxyalkyl or $R^3$ and $R^4$ together with the N atom linking them represent a pyrrolidine ring or a piperidine, morpholine or hexamethyleneimine ring which can also be substituted by up to 4 $C_1$- to $C_4$-alkyl groups, and in the formula (III)

r, s and t are identical or different integers from 2 to 6, v represents an integer from 0 to 3, and $R^6$ and $R^7$ represent identical or different radicals $R^5$ or represent a group of the formula (V) and T has the meaning of a group of the formula (VI)

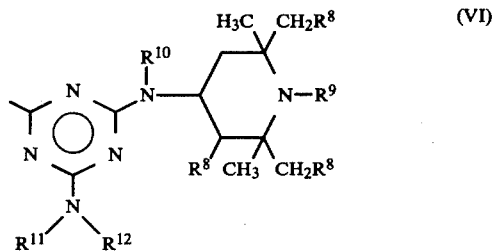

(VI)

in which $R^8$ and $R^9$ have the meanings indicated above, $R^{10}$ and $R^{11}$ are identical or different radicals having the meaning of $R^3$ and $R^{12}$ is a radical having the meaning of $R^4$, and in the formula (IV)

$R^5$ represents a radical $R^4$ or a group of the formula (VII) or (VIII),

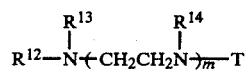

(VII)

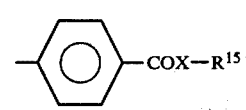

(VIII)

in which

X represents O or $NR^3$, with $R^3$ as indicated above and $R^{15}$ represents $CH_3$, $C_2H_5$ or a group of the formula (V), m is 0 or 1, T is a radical of the formula (VI), $R^{12}$ is $C_2$- to $C_6$-alkylene, $R^{13}$ is a radical $R^4$ or T and $R^{14}$ is a radical $R^4$ and the formula (I) must contain at least one group of the formula (V).

* * * * *